3,008,994
CHLORO-ALLYLAMINES
Donald G. Kundiger and Robert L. Soulen, Manhattan, Kans., assignors to The Dow Chemical Company, Midland, Mich., a corporation of Delaware
No Drawing. Filed Jan. 16, 1959, Ser. No. 787,125
1 Claim. (Cl. 260—583)

The present invention relates to amines and it is particularly directed to secondary and tertiary (3,3-dichloro-2-methyl-2-propenyl) amines. The present compounds correspond to the formula $$(Cl_2C=CCH_3-CH_2)_nNH_{3-n}$$

wherein $n$ is an integer from 2 to 3 inclusive. The novel compounds are liquids or crystalline solids soluble in many common organic solvents such as diethyl ether, acetone, and ethanol and essentially insoluble in water. The novel compounds are useful as insecticides, nematocides, fungicides, and selective herbicides.

The novel compounds are prepared by reacting 1,1,3-trichloro-2-methyl-1-propene with anhydrous ammonia. The reaction may be carried out by contacting the two reactants in the absence of a reaction medium; however, preferably, the reaction is carried out in an inert liquid reaction medium which may be diethyl ether, dioxane, methylcyclohexane or preferably ethanol. The reaction takes place over a wide range of temperatures, and may be carried out at any desired temperature from room temperature (approximately 20° C.) to the boiling temperature of the reaction mixture under atmospheric pressure. Advantageously, the reaction is carried out at higher temperatures within this range, whereat the desired product is formed more quickly and in more efficient yield. During the course of the reaction, hydrogen chloride of reaction is formed. Such hydrogen chloride reacts with further ammonia and thus appears in the reaction mixture as ammonium chloride. Ammonium chloride byproduct is relatively insoluble in ethanol, and at a convenient point or points during the course of, or upon completion of the reaction may be removed in known manners, as by decantation, filtration, centrifuging, and the like. The reaction is exothermic; and usually provides adequate heat to maintain the reaction mixture at a temperature in the desired temperature range. Reaction temperatures may be controlled by regulating the rate of contacting of the reactants, by external heating, or by external cooling as needed. Moreover, the employment of a reaction medium which boils with resulting limitation of temperature rise, within the desired reaction-temperature range, provides a ready means for control of the reaction temperature. Ethanol is such a reaction medium.

In carrying out the reaction, the reactants may be contacted in any order and in any desired manner. In a preferred manner, the 1,1,3-trichloro-2-methyl-1-propene reactant is dissolved in ethanol at room temperature and under reflux, and anhydrous ammonia bubbled thereinto. The reaction may be considered to be complete when either further ammonium chloride precipitate ceases to form in the reaction mixture, or when ammonia added to the reaction mixture escapes, quantitatively, uncombined. Upon completion of the reaction, the reaction mixture may be acidified, as by bubbling in hydrogen chloride as a gas, and then filtered to remove a product solid comprising ammonium chloride byproduct together with the hydrochlorides of the desired primary and secondary amines. This product solid may, if desired, be washed with a solvent, such as diethyl ether, whereby to remove any of the unreacted 1,1,3-trichloro-2-methyl-1-propene and any of the tertiary amine thereof from the residue. Such washings may be combined with the filtrate which may thereafter be warmed to vaporize and remove most of the solvent and thereafter be fractionally distilled at subatmospheric pressures. In such procedure there is removed any unreacted 1,1,3-trichloro-2-methyl-1-propene at, for example, 65–70° C. at 35 millimeters pressure; the tris-(3,3-dichloro-2-methylallyl)-amine product remains as a pot residue and is obtained from such residue by recrystallization from solvent as, for example, 95 percent ethanol.

The amines of the present invention may be isolated and purified from the said product solid by mixing the said solid, preferably in finely divided form, intimately into a strong aqueous alkali, whereupon the resulting mixture divides into an aqueous byproduct phase and an oily product phase. The oily product phase is removed, as in a separatory funnel, and the aqueous byproduct phase may be extracted several times with an immiscible solvent such as diethyl ether, the ether extractions being combined with the product phase and thereafter dried over anhydrous magnesium sulfate. The resulting dried organic solution is then filtered and fractionally distilled to remove, first, solvent, and thereafter, at gradually increasing temperatures and sub-atmospheric pressures the 3,3-dichloro-2-methylallylamine and the bis-(3,3-dichloro-2-methylallyl)-amine. In isolated form, the present secondary amine is a liquid and may be further purified by fractional distillation at subatmospheric pressures. The present tertiary amine is a crystalline solid and may be further purified by recrystallization from solvent which may be 95 percent ethanol, if desired.

The following example merely illustrates the present invention but is not to be considered as limiting it.

*Example*

Anhydrous ammonia was bubbled into and beneath the surface of a solution of 3 moles (480 grams) of 1,1,3-trichloro-2-methyl-1-propene in 500 millimeters of 95 percent ethanol, in a reaction vessel. The resulting temperature rise was controlled by regulating the rate at which ammonia was bubbled into the solution and by external cooling of the reaction vessel in an ice bath, to maintain a reaction temperature of approximately 30° to 35° C. The introduction of ammonia in an undetermined amount was continued over a period of about 3.5 hours. At the end of this time escaping ammonia was approximately equal in amount to ammonia introduced, indicating that no further ammonia was being accepted in the reaction mixture. Thereupon, ammonia feed was discontinued and gaseous hydrogen chloride was thereafter bubbled into the reaction mixture in an amount sufficient to render the resulting mixture acid to litmus. During the addition of ammonia, and thereafter during the addition of hydrogen chloride, a precipitate formed in and settled in the reaction mixture. The resulting mixture was thereafter filtered to separate the liquid phase from the solid phase. The solid residue was washed with diethyl ether and ether washings added to the liquid ethanol solution filtrate.

The ethanol solution filtrate phase combined with diethyl ether washings was warmed under subatmospheric pressure whereby to vaporize and remove volatile solvents, and thereafter fractionally distilled at slowly rising temperatures and under declining subatmospheric pressures. The condensate collected in the distillation procedure contained, initially, further portions of solvents; thereafter, unreacted 1,1,3-trichloro-2-methyl-1-propene was recovered and thereafter, there were recovered 74 grams of tris(3,3-dichloro-2-methylallyl)-amine as a pot residue. This pot residue was recrystallized from 95 percent ethanol to obtain the said triamine as a white crystalline solid having a melting point of 63.5°–65° C. in a yield corresponding to 32 percent of the reacted starting halides.

The solid residue from the filtration of the original reaction mixture was dispersed in a strong sodium hydroxide solution, whereof the sodium hydroxide was in excess of the amount equivalent to the hydrochlorides present in the residue. Ammonia was liberated as a gas and the resulting aqueous dispersion divided into an oily organic phase and an aqueous byproduct phase. The phases were separated and the aqueous byproduct phase extracted several times with diethyl ether, these extractions being combined with the oily organic phase which was thereafter dehydrated over anhydrous magnesium sulfate, filtered, and fractionally distilled at slowly rising temperatures and under gradually declining sub-atmospheric pressure to obtain 6.6 grams of 3,3-dichloro-2-methylallyl amine which is equivalent to 3 percent based on recovered starting halide, as an oily liquid boiling at 31°–35° C. under a pressure of 0.4–0.9 millimeter and having a refractive index $n/D$ of 1.5052 at 20° C. There was further recovered 150 grams of bis(3,3-dichloro-2-methylallyl)-amine as a stable oily liquid at room temperatures, boiling at 101°–104° C. at 0.3–0.35 millimeter pressure and having a refractive index $n/D$ of 1.5247 at 20° C. The 150 grams represented 65 percent yield based on total of reacted halide.

The bis-(3,3-dichloro-2-methylallyl)-amine was analyzed and found to have contents of chlorine and nitrogen of 53.5 and 5.2 percent respectively as compared to 53.9 and 5.3 percent, theoretical, respectively. The tris-(3,3-dichloro-2-methylallyl)-amine was analyzed and found to have contents of chlorine and nitrogen of 54.5 and 3.2 respectively as compared to 55.1 and 3.6 percent, theoretical. The said tris- amine would not form a hydrochloride salt. Infrared spectrum of each compound fully supported the assigned structure.

The compounds of the present invention have many agricultural pesticidal uses. In such use, the unmodified compounds may be employed. Alternatively, the compounds may be dispersed on an inert finely divided solid and the resulting preparation employed as a dust. Also, such preparations may be dispersed in water with or without the aid of a wetting agent and the resulting aqueous suspensions employed as sprays. In other procedures, the compounds may be employed in oil or other solvent or as a constituent of solvent-in-water or water-in-solvent emulsions or as aqueous dispersions thereof which may be applied as spray, drench, or wash. In a representative operation, the introduction into a water suspension of a large and healthy population of plant parasitic root knot nematode larvae (of the genus Meloidogyne) of the bis-(3,3-dichloro-2-methylallyl)-amine of the present invention as sole toxicant in an amount equal to 10 parts of toxicant per million parts by weight of ultimate aqueous suspension resulted in a 100 percent kill of the said rootknot nematodes in a period of less than 6 days; whereas a similar nematode suspension treated identically except that the present amine was omitted showed practically no mortality.

In a further operation, the application of an aqueous dispersion containing 100 parts of the present compound per million parts by weight of the ultimate composition to the germinant seeds and emerging seedlings of canary grass (*Phalaris canariensis*) resulted in a 99 percent kill of the said germinant seeds and emerging seedlings.

Various modifications of the process and products of the present invention may be made without departing from the spirit or scope thereof, and is to be understood that we limit ourselves only as defined in the appended claim.

We claim:

Di-(3,3-dichloro-2-methylallyl)-amine.

References Cited in the file of this patent

FOREIGN PATENTS 494,416     Canada _____ July 14, 1953